(12) United States Patent
Cripe et al.

(10) Patent No.: US 6,384,292 B1
(45) Date of Patent: *May 7, 2002

(54) METHOD FOR DECOMPOSITION OF CHEMICAL COMPOUNDS

(75) Inventors: Jerry D. Cripe, Tempe; Gerard T. Reed, Mesa; James C. Koontz, Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/473,634

(22) Filed: Jun. 7, 1995

Related U.S. Application Data

(63) Continuation of application No. 08/235,626, filed on Apr. 29, 1994.

(51) Int. Cl.⁷ .............................................. B01D 53/38
(52) U.S. Cl. ...................................... 588/205; 423/210
(58) Field of Search .......................... 588/205; 423/446, 423/240 S, 210

(56) References Cited

U.S. PATENT DOCUMENTS

| 4,386,258 A | * | 5/1983 | Akashi et al. | ........... 219/121 P |
|---|---|---|---|---|
| 5,137,701 A | * | 8/1992 | Mundt | ........................ 423/210 |
| 5,183,647 A | * | 2/1993 | Harada et al. | ............... 423/239 |
| 5,275,798 A | * | 1/1994 | Aida | .......................... 423/446 |

FOREIGN PATENT DOCUMENTS

| EP | 0577344 | 5/1994 |
|---|---|---|
| GB | 705011 | 3/1952 |
| GB | 2071970 | 9/1981 |
| GB | 2136258 | 9/1984 |
| JP | 4279179 | 5/1992 |

* cited by examiner

*Primary Examiner*—Stuart L. Hendrickson
(74) *Attorney, Agent, or Firm*—Mark J. Fink

(57) ABSTRACT

An apparatus for and method of decomposing a chemical compound, which may be an environmentally undesirable material, is accomplished by impinging a flow of the chemical compound on a heated member. Various embodiments are possible, including having the member have a plurality of openings, having the member be configured to direct the flow of the chemical compound in a particular direction, and having the member be self supported on the wall of the reaction chamber.

17 Claims, 3 Drawing Sheets

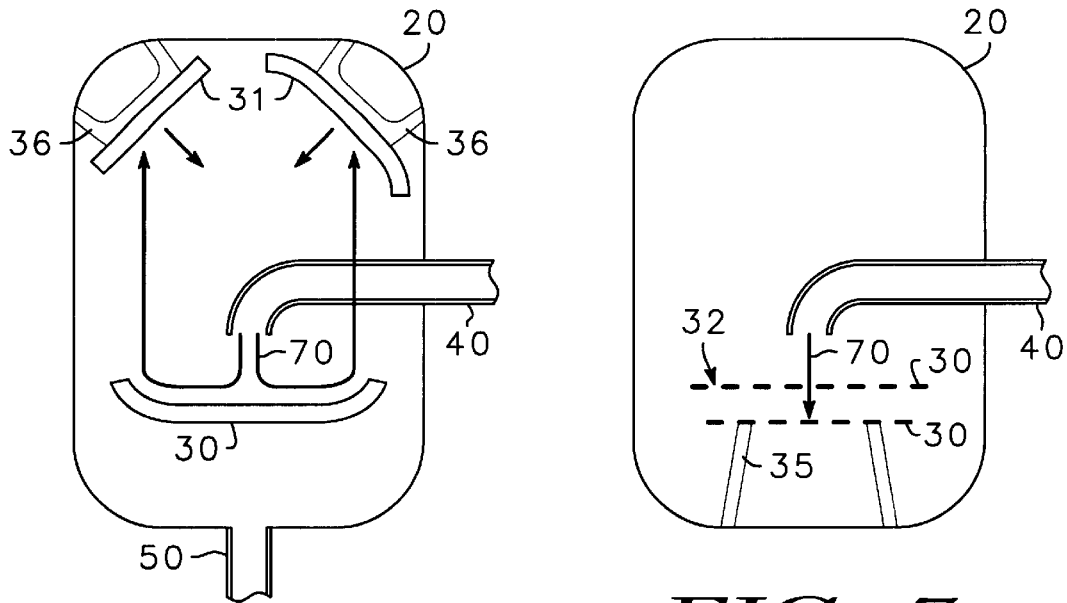
FIG. 4
FIG. 7
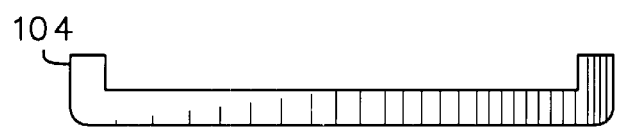
FIG. 5
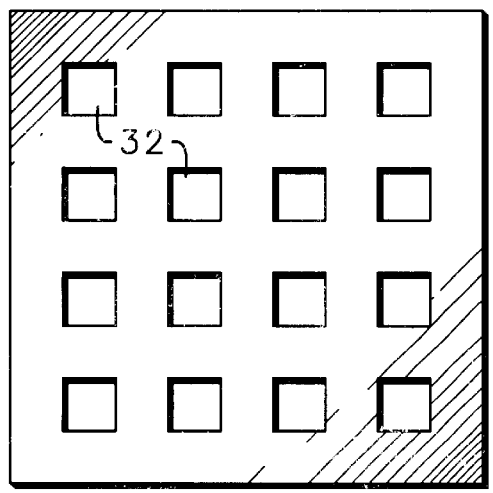
FIG. 6

METHOD FOR DECOMPOSITION OF CHEMICAL COMPOUNDS

This is a division of application Ser. No. 08/235,626, filed Apr. 29, 1994.

This application is related to co-pending applications Ser. Nos. 08/236,913, 08/235,623, and 08/235,609, all filed concurrently on Apr. 29, 1994.

BACKGROUND OF THE INVENTION

This invention relates, in general, to decomposition of chemical compounds, and more particularly, but not limited to, an apparatus and method for decomposing a chemical compound into environmentally acceptable materials.

Chemical compounds, in particular, environmentally undesirable materials (which can include hazardous materials), such as halogenated organic compounds or volatile organic compounds, are widely used in many manufacturing areas as reactive agents, solvents, and refrigerants.

As is well known, these environmentally undesirable materials are detrimental to people and the environment by generating harmful substances and/or destroying the stratospheric ozone layer and/or by generating global warming effects. Although these environmentally undesirable materials are widely used in industrial, chemical, automotive, and pharmaceutical industries, it is clear that either the use of these materials must be stopped or severely limited, or the destruction of such materials must be improved in order to comply with increasing regulations.

In many manufacturing situations, it is impossible to stop using many environmentally undesirable materials because no substitute materials which are environmentally acceptable are available at the present time. Thus, an efficient, cost effective method of decomposing environmentally undesirable materials to environmentally acceptable and/or nonhazardous materials is not only necessary to be in compliance with anti-pollution regulations and to protect the environment, but necessary to continue manufacturing many products which require the use of environmentally unacceptable materials.

In the past, there were three prevalent techniques to decompose or alter environmentally undesirable materials to environmentally acceptable materials. The first method involves using a radio frequency (RF) induced plasma reaction to decompose the environmentally undesirable materials. However, a method using solely an RF plasma induced reaction has not been proven to be effective in destroying some environmentally undesirable materials at the desired efficiency levels, nor has it been proven to be cost effective. Currently available units can not destroy halogenated organic compounds with suitable efficiencies. One of the disadvantages of this method is that it is difficult to maintain the plasma in a controlled fashion to destruct environmentally undesirable materials.

A second method of destroying environmentally undesirable materials includes combustion of the environmentally undesirable material. Combustion techniques have extremely low efficiency due to burning of a great amount fuel in the form of hydrogen or hydrocarbons. In addition, combustion can not be performed in a vacuum, thus, vacuum pumps used in manufacturing must be subjected to the environmentally undesirable materials, which increases the maintenance of the vacuum pumps. In some situations, it would be desirable to destroy the environmentally undesirable materials under a vacuum to avoid exposure of the environmentally undesirable materials to vacuum pumps.

A third method of decomposing environmentally undesirable materials involves transforming environmentally undesirable materials into liquid form by cryopumping. The liquid form of the environmentally undesirable materials are recoverable, but still environmentally unsafe and require risk through handling and transportation. Disadvantages of this method are that it is very expensive and maintenance intensive. In addition, the cryopumping apparatus has a large footprint. A large amount of space where the environmentally undesirable materials are produced is not available in many manufacturing situations. In addition, a potentially dangerous situation can arise if cryopumping is utilized where there is a potential to condense compounds which are pyrophoric in condensed form and are still hazardous materials. Due to this danger, cryopumping is not an alternative in many industries.

The efficiency target for destruction of environmentally undesirable material such as halogenated organic compounds is 80% or greater. None of the methods described above provide this efficiency level in a cost effective manner. Thus, it would be desirable to destroy environmentally undesirable material using an efficient, cost effective method.

SUMMARY OF THE INVENTION

An apparatus for and method of decomposition of a chemical compound comprises a reaction chamber having an inlet for providing a flow of a chemical compound into the reaction chamber and an outlet, a member positioned in the reaction chamber, an energy source capable of generating an energy to heat the member, and a conduit physically coupled to the inlet of the reaction chamber for directing the flow of a chemical compound to impinge on the member so that the chemical compound receives heat from the member when the member is heated.

BRIEF DESCRIPTION OF THE DRAWINGS

FIG. 4 illustrates an embodiment of a portion of the present invention;

FIG. 5 illustrates another embodiment of a member utilized in the present invention;

FIG. 6 illustrates another embodiment of a member utilized in the present invention;

FIG. 7 illustrates another embodiment of a portion of the present invention;

DETAILED DESCRIPTION OF THE DRAWINGS

An apparatus for and method of decomposing or reacting a chemical compound 70, which may be an environmentally undesirable material, to end product(s) 77, which are desirably environmentally acceptable materials, or materials which can be further utilized before conversion into environmentally acceptable materials is presented.

Figure 1:
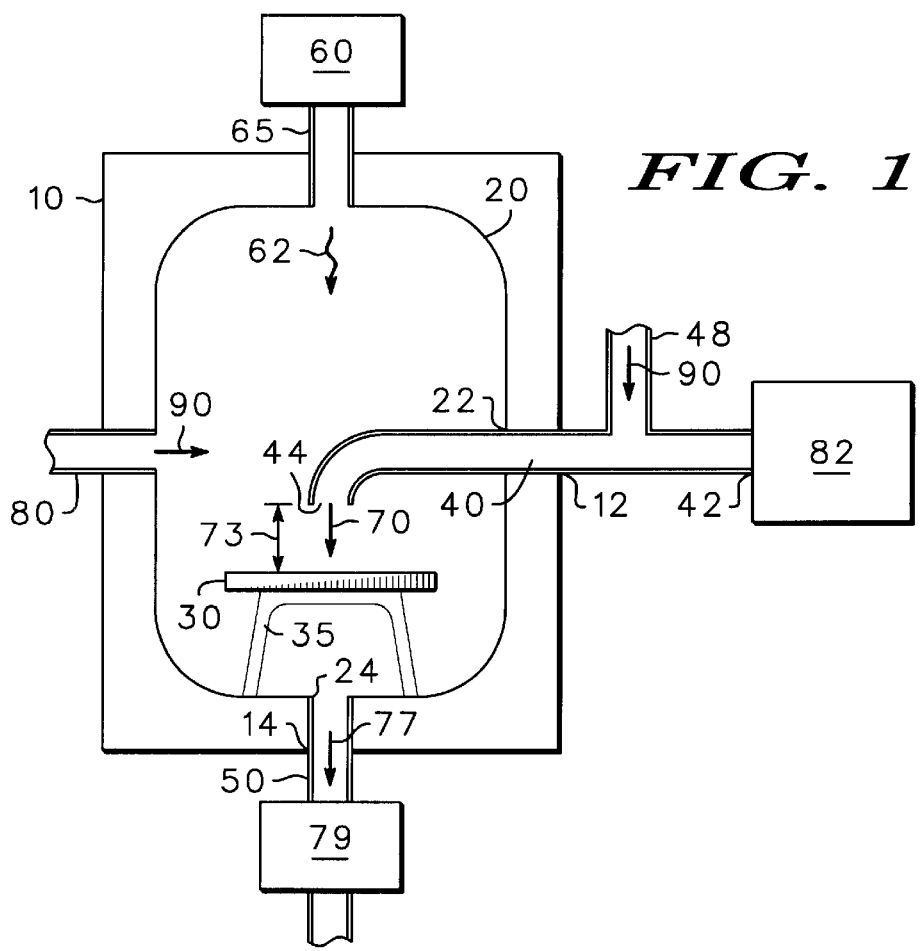
FIG. 1 illustrates a side view of an embodiment of the present invention.

FIG. 1 illustrates a simplified schematic view of an embodiment of an apparatus of the present invention. A housing 10 is provided to house a reaction chamber 20. An energy source 60 may be positioned inside or outside of housing 10. An energy 62 is generated from energy source 60 and is transferred to reaction chamber 20. A portion of the walls of reaction chamber 20 must transmit energy 62 produced by energy source 60. An example of this is a window comprised of quartz and formed in reaction chamber 20. The walls of housing 10 should be comprised of a material which contains energy 62 from energy source 60. Stainless steel is one example of such a material. Housing 10 has an inlet 12 and an outlet 14 which are physically coupled to an inlet 22 and an outlet 24, respectively, of reaction chamber 20. Inlet 22 and outlet 24 of reaction chamber 20 are shown as openings in the wall of reaction chamber 20.

Reaction chamber 20 provides a reaction zone for the destruction or decomposition of chemical compound 70. Chemical compound 70 is defined as a chemical compound (s) in a gaseous state. Examples of chemical compound 70 are halogenated organic compounds, hydrides, or volatile organic compounds which may be generated by a processing tool 82. An example of processing tool 82 is an RF plasma deposition or etch tool used in semiconductor processing.

Chemical compound 70 must be introduced toward or impinge member 30 to decompose chemical compound 70 at suitable efficiencies. When chemical compound 70 is decomposed it can then react with a reactive material (disclosed below) provided in reaction chamber 20 to form an end product(s) 77. End product 77 is comprised of decomposed portions of chemical compound 70. End product 77 is desirably an environmentally acceptable material. End product 77 exits through outlet 24 and a conduit 50 which is physically coupled to outlet 24 of reaction chamber 20. End product 77 may be exhausted to the atmosphere after exiting through conduit 50 or may be run through a scrubber system, where a portion of end product 77 will react with another material which can then be released to the atmosphere. Scrubber systems are well known in the art.

In certain applications, it may be desirable or necessary to have the reaction chamber subjected to a vacuum. A vacuum can be provided in reaction chamber 20 by a vacuum pump 79 physically coupled to conduit 50. Thus, reaction chamber 20 may be placed between processing tool or equipment 82 which generates chemical compound 70 and vacuum pump 79. Vacuum pump 79 can be the same pump that is already utilized in many processes downstream from processing tool 82 which produces chemical compounds that operate in a vacuum.

Operation of the present invention may be at down in the 100 millitorr range or above. However, an advantage of the present invention is that operation may also take place up around 100–500 torr. Although operation may take place above this level, safety requirements realistically prevent the operation of this type of apparatus at or above atmospheric pressure (760 torr). The prior art pure RF plasma method of destroying chemical compound discussed before is only capable of running in the millitorr range, rather than torr range, because you have to be below one torr to maintain an RF plasma without having to introduce other costly means of maintaining the RF plasma, such as hydrogen fuel.

The size of reaction chamber 20 is important; reaction chamber 20 should be large enough so that the residence time of chemical compound 70 is sufficient to allow destruction of chemical compound 70. Typically, the footprint of the apparatus of the present invention is small enough that it can be utilized adjacent to the equipment which produces chemical compound 70 or as part of roof scrubber systems.

The inside of the wall of reaction chamber 20 is preferably comprised of a material which does not substantially react with chemical compound 70 or end product 77. The wall of reaction chamber 20 (excluding the portion which transmits energy 62) may be either transparent or opaque to radiant energy, e.g., the energy given off from the reactions taking place in reaction chamber 20 and energy radiating from a member 30 (described below).

A transparent wall may be comprised of quartz. A transparent wall provides a means for some radiant energy to escape. It is believed that when destroying some types of chemical compounds 70, allowing some of the radiant energy to escape provides for driving the reaction towards the end products, end product 77. If some of the radiant energy is held in the reaction chamber, the reaction may be driven the other way, towards chemical compound 70. In the case where the walls of reaction chamber 20 are comprised of quartz, no substantial reaction takes place between chemical compound 70 and the quartz of the reaction walls because chemical compound 70 has already been broken down and reacted with a portion of member 30 to form end product 77, and/or in one embodiment, quartz does not inductively couple with energy 62 of energy source 60, therefore, it remains cool (relative to the temperature of member 30), which does not provide for the necessary heat to decompose chemical compound 70 near its surface.

An opaque wall may be comprised of a metal, which does not couple with energy 62 of energy source 60, with a radiant energy absorption coating, such as steel or aluminum with black anodized or black manganese oxide coatings. It is believed that an opaque wall will absorb and transfer some radiant energy from reaction chamber 20 and drive the reaction to end product 77. In addition, the metal of the opaque wall provides for corrosion resistance not found in some other materials.

Member 30 is positioned within reaction chamber 20. Member 30 is a plate and is comprised of a material that can be heated by energy source 60. In a preferred embodiment, the portion of member 30 which is heated is heated to a temperature of approximately 200–1400° C. It is believed that temperatures below 200° C. will not decompose most chemical compounds 70. Temperatures above 1400° C. are not desirable because they will start to melt materials used herein. The shape, size, and composition of various embodiments of member 30 is disclosed below. Member 30 may be positioned in reaction chamber 20 by a support structure 35. Support structure 35 is comprised of a material which can withstand the temperatures in reaction chamber 20. Quartz is an example of what support structure 35 may be made of. Another support means is illustrated and described below.

Some kind of reactive material is desirably provided in reaction chamber 20 in order to react with decomposed chemical compound 70 so that decomposed chemical compound will not recombine. An optional feature of the present invention is the introduction of a reactive material 90 into reaction chamber 20. Reactive material 90 may be provided through an inlet 80 provided through housing 10 and into reaction chamber 20. Alternatively, reactive material 90 may be mixed with chemical compound 70 prior to entering reaction chamber 20 through conduit 48. In some processes, reactive material 90 may be generated from tool 82 in conjunction with chemical compound 70.

Reactive material 90 is a material which reacts with chemical compound 70 to form all or a portion of end product 77. Reactive material 90 can be an oxidizing or reducing agent, such as for example, water vapor, oxygen, ammonia, hydrogen, methane, or nitrous oxide which will react with chemical compound 70. An example of a reaction of chemical compound 70, $C_2F_6$, with $H_2O$ is as follows: $C_2F_6+O_2+H_2O \rightarrow CO_2+HF$. If reactive material 90 is utilized, then the impinged surface of member 30 may or may not be comprised of a material which does not react with chemical compound 70.

Energy source 60 is preferably an electric heat generator, although other means, such as an electron beam may be used. The use or combustion of fuels or use of electron beams to heat member 30 is undesirable from a cost, safety, and cleanliness standpoint. A combustion process is not desirable because it also creates undesirable end products. When energy source 60 is comprised of an electric heat generator, at least a portion of member 30 must be electrically heated by energy source 60 to a temperature greater than or equal to 200° C.

Most preferably, energy source 60 is comprised of a microwave energy source. A microwave energy source is preferable because it is believed that the molecular vibration of chemical compound 70 by microwave energy in combination with chemical compound 70 receiving heat from member 30 is necessary to destruct some chemical compounds 70. It is further believed that a microwave energy source, rather than other forms of dielectric heating done at lower frequencies, is necessary to destruct certain chemical compounds 70 that will not be destroyed at suitable efficiency levels by using other energy sources having a frequency range lower than 0.9 GHz. It is believed that $C_2F_6$ can not be decomposed at suitable efficiency levels without the use of microwave energy. Where a microwave energy source is not required for decomposition, a microwave energy source is still preferable because of its low cost, both operational and capital.

The microwave energy source preferably operates at a power of 100 to 5,000 watts and a microwave frequency of 0.9–10 GHz. A frequency of 2.45 GHz is most preferred because of cost and it has been federally authorized for commercial use. When a microwave energy source is used, it is desirable to have energy source 60 external to housing 10 and energy 62 supplied through a waveguide 65 into reaction chamber 20 as shown in FIG. 1.

When a microwave energy source is used, member 30 must be comprised of a material which inductively couples with the microwave energy. A material which inductively couples with microwave energy will be directly heated by the microwave energy to a temperature equal to or greater than 200° C. Examples of suitable materials that inductively couple to microwave energy source are lead, zinc, tin, antimony, silver, iron, titanium, nickel and cobalt or any alloy thereof. Other materials may couple with a microwave energy source, but may not be suitable because they are toxic or have other undesirable properties, such as vaporizing at the temperatures of operation. Examples of materials that do not inductively couple with microwave energy are copper, gold, silicon, quartz, other glasses, and ceramics. Materials that do not inductively couple with microwave energy can be doped with materials that do inductively couple with microwave energy. For example, member 30 may be comprised of silicon carbide doped with any of the above materials which couple with microwave energy.

The manner in which chemical compound 70 is introduced into reaction chamber 20 is critical to the invention. Chemical compound 70 is introduced into the reaction chamber so that chemical compound 70 bombards or impinges against member 30 so that hot wall reactions can take place. If member 30 is shaped in a plate configuration having two major surfaces as shown in FIG. 1, then it is preferable to have member 30 be positioned such that the major surface of member 30 which is impinged by chemical compound 70 is not substantially parallel to the flow of chemical compound 70. Another way to state this is to have the major surface of member 30 positioned substantially perpendicular to the flow of chemical compound 70.

Optimally, the flow of chemical compound 70 is introduced into the reaction chamber so that chemical compound 70 bombards or impinges against member 30 having a solid impinged surface when chemical compound 70 is comprised of halogenated organic compounds, for example. Halogenated organic compounds have higher activation energies than, for example, volatile organic compounds such as alcohols, and are believed to require the physical collisions to reach suitable decomposition efficiencies.

In the embodiment shown in FIG. 1, conduit 40 is physically coupled to inlet 12 of reaction chamber 20 and inlet 24 of housing 10. Conduit 40 has an end 42 coupled to a processing tool 82 where chemical compound 70 is generated and an exit end 44 where chemical compound 70 exits into reaction chamber 20. Conduit 40 provides for introducing chemical compound 70 into reaction chamber 20 by restricting the flow of chemical compound 70 as it exits into reaction chamber 20 to a confined portion of reaction chamber 20 and directing the flow towards member 30. The portion of conduit 40 which is inside reaction chamber 20 should be comprised of a material which is transparent to energy 62 from energy source 60, such as quartz. The portion of conduit 40 which is outside of reaction chamber 20 can be comprised of, for example, stainless steel. The inside cross-sectional area of conduit 40 is dependent on the desired flow rate of chemical compound 70, among other things. The purpose of having conduit 40 extend into reaction chamber 20 is to direct the flow towards member 30 and when energy source 60 is comprised of microwave energy, to expose chemical compound 70 to microwave energy before and during impingement of chemical compound 70 on member 30. This exposure may be required to decompose certain chemical compounds 70 at suitable efficiencies.

To obtain optimum destruction of chemical compound 70, exit end 44 is positioned as close as possible to member 30. This position is not necessarily preferred because it is desirable to have a nonrestrictive flow of chemical compound 70 where chemical compound 70 does not backflow into processing tool 82. A minimum distance 73 between exit end 44 of conduit 40 and the major surface of member 30 towards which chemical 70 is introduced is preferably the distance where the flow rate of chemical compound 70 is not altered, i.e., so that the introduction of chemical compound 70 towards member 30 is transparent to processing tool 82 which generated chemical compound 70. This minimum distance can also be calculated as the distance where the inside cross-sectional area of conduit 40 is equal to the escape surface area, which is defined as the length of the perimeter of the inside cross-sectional area of conduit 40 multiplied by the distance from exit end 44 and the impinged surface of member 30. This is preferred so that no chemical compound 70 back flows into processing tool 82 which generated chemical compound 70 and possibly contaminate processing tool 82.

As stated above, chemical compound 70 must be introduced toward or impinge member 30 to obtain decomposition efficiency levels of a minimum of 80%. The surface of member 30 on which chemical compound 70 is introduced must be in the path of the flow of chemical compound 70. Exit end 44 must be close enough to the major surface of member 30, as shown by distance 73, to at least allow for the transfer of heat by conduction of heat and/or radiation of heat from member 30 to chemical compound 70, otherwise, destruction of chemical compound 70 will not take place at an efficiency level of greater than 80%.

Exit end 44 should not be placed at a distance greater than the distance away from the member where sufficient hot wall reactions of the chemical compound will take place to decompose the chemical compound at an efficiency level of a minimum of 80%. The distance where the introduction of chemical compound 70 towards member 30 is transparent to processing tool 82 multiplied by 2 is believed to be the maximum distance where destruction efficiencies of 80% or greater will be obtained.

Another way to define this maximum distance is the distance where the escape surface area is equal to the cross-sectional area of conduit 40 multiplied by 2. It is believed that placing exit end 44 of conduit 40 further than this maximum distance will allow too much of chemical compound to not make physical contact with member 30 and/or not allow chemical compound 70 to receive heat from member 30, and therefore decomposition efficiencies above 80% will never be achieved.

Exact distances 73 between exit end 44 and member 30 where suitable destruction efficiency is obtained will vary according to various parameters, such as the flow rate of chemical compound 70, the composition of chemical compound 70, and the temperature of member 30, among other parameters. Once the critical parameters are defined, one skilled in the art can design the reaction zone appropriately according to the present invention.

For the present invention to have the desired efficiencies of destruction of chemical compound 70, energy source 60 must supply enough energy to heat member 30 to allow destruction of chemical compound 70 at the desired efficiency levels when heat is received by chemical compound 70 from member 30, with or without a plasma (explained further below) induced reaction of chemical compound 70 in reaction chamber 20.

The physical collision of chemical compound 70 against member 30, while chemical compound 70 is hot from receiving heat from member 30 may be necessary to cause the molecules of some forms of chemical compound 70, such as halogenated organic compounds, to break. When chemical compound 70 is comprised of compounds that can ignite, the receipt of heat from member 30 is believed to be all that is necessary to cause ignition and therefore destruction at suitable efficiency levels. Even in this case, to achieve the desired efficiencies, it is still necessary to introduce the flow of chemical compound 70 towards member 30 so that chemical compound 70 can receive heat from member 30.

In certain applications, it may be desirable to also generate a plasma within reaction chamber 20. The present invention may operate at an acceptable efficiency level without the use of a plasma, or alternatively, member 30 provides enough radiant energy to maintain the plasma during operation, without the use of other fuels. In the destruction of halogenated organic compounds, it is believed that a plasma may be necessary, because it weakens and breaks bonds when other forms of destruction are inefficient. There are many ways known in the art to generate plasmas. A plasma is generated when gases such as oxygen or nitrogen are excited by energy 62 of energy source 60. These gases may be supplied in reaction chamber through conduit 48 into conduit 40, for example.

Figure 2:
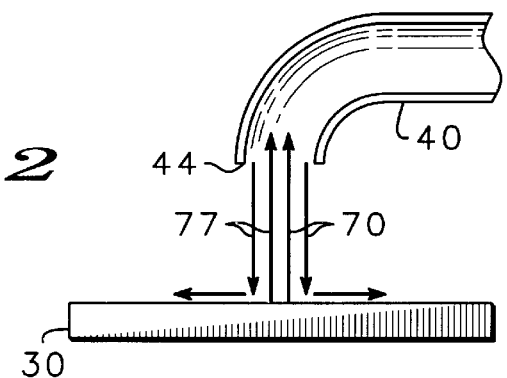
FIG. 2 illustrates an embodiment of a portion of the present invention.

FIG. 2 illustrates the operation of the present invention. Only a portion of the present is shown for illustrative convenience. In operation, a flow of chemical compound 70 moves through conduit 40 (as shown by the arrow) toward member 30 in a environment exposed to, in one embodiment, microwave energy absorption and resonance. As the gas molecules of chemical compound 70 impinge on member 30, the temperature of chemical compound 70 is elevated and then condensed owing to collision pressure against member 30. The temperature and gas density increase until detonation of chemical compound 70 is achieved. The detonation of chemical compound 70 directs the flow of at least a portion of the detonated chemical compound 70 gases back into a portion of conduit 40 by virtue of the positioning of member 30 in the path of the flow of chemical compound 70. It is believed that this brings about the ability for the apparatus of the present invention to have a higher efficiency of decomposition of chemical compound 70 by reworking partially decomposed chemical compound 70 and/or end product 77 as these detonations which cause an overall pressure variation which does not cause backflow into processing tool 82, create microsecond repeating detonation waves which keep the molecules of chemical compound 70 reworking and recycling from the impinged surface of member 30 and into a portion of conduit 40 to enhance residence time of chemical compound 70, resulting in achievable high efficiencies of decomposition. The detonation rebound and rework of chemical compound 70 by a surface impinged, heated member 30 does not take place in, for example, packed bed reactors. In packed bed reactors, molecules are not reworked back across the same path as they are in the present invention.

For some chemical compounds 70, this detonation rebound and rework of chemical compound 70 by a thermally heated member 30 by itself, without microwave resonance, will make significant efficiency improvements over existing non-surface impinging, radiant thermal decomposition methods.

Figure 3:
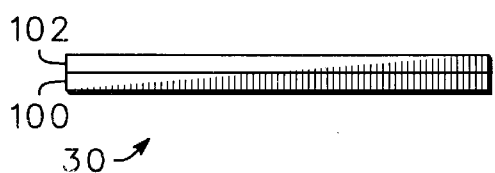
FIG. 3 illustrates an embodiment of a member utilized in the present invention.

FIGS. 3–9 illustrate various embodiments of member 30. FIG. 3 illustrates a first embodiment of member 30. Here, member 30 is comprised of a material 100 which is heated by energy 62 of energy source 60. The total mass of material 100 should be in large enough to provide adequate absorption and radiation of heat. In this embodiment, the surface of member 30 on which chemical compound 70 is introduced is comprised of a reactive material 102 which reacts with the decomposed chemical compound 70 to form end product 77. Reactive material 102 which reacts with chemical compound 70 can be, for example quartz, silicon dioxide ($SiO_2$), graphite, ceramics, or aluminum oxides. An example of a reaction of chemical compound 70, $C_2F_6$, with $SiO_2$ is as follows: $C_2F_6 + SiO_2 \rightarrow CO_2 + SiF_4$. It is not required that member 30 be comprised of a material which is reactive with chemical compound 70 if a reactive material 90 is provided as shown in FIG. 1.

It is believed that in order to obtain the desired destruction efficiencies, the surface of member 30 on which chemical compound 70 is introduced must have at least the same area as the cross-sectional area of the flow of chemical compound 70, i.e., the cross-sectional area of the opening at exit end 44 of conduit 40. Member 30 is desirably at least 2 times larger than the cross-sectional area of conduit 40 so that the residence time of 70 is adequate to start breakdown destruction reactions occurring. The impinged surface of member 30 may have any shape.

FIG. 4 illustrates a second embodiment of member 30. Only a portion of the apparatus is shown for illustrative convenience. Here, member 30 is configured to direct more of the flow of chemical compound 70 into reaction chamber 20 back toward and behind exit end 44 of conduit 40. In this embodiment, member 30 is shown to have a curved shape. In this manner, the residence time of chemical compound 70 may be increased. The configuration increases the residence time of chemical compound 70 before flowing out through outlet 50 so that optimum destruction and conversion to end product 77 can take place.

FIG. 4 also illustrates an embodiment where a plurality of members 30 may be used. Reaction chamber 20 has a first end and a second end; outlet 50 is positioned at the second end and the first end is opposite the second end. Additional members 31 may be positioned at the first end behind exit end 44 of conduit 40 in the path of chemical compound 70. Members 31 are the same as member 30. Preferably, additional members 31 are positioned at the first end by a support structure 36. Support structure 36 can be comprised of the same material as support structure 35, however, support structure 36 must be attached to the walls of reaction chamber 20 and member 31 must be attached to support structure 36. The method of attachment will depend on what support structure 36 and reaction chamber 20 are comprised of. The manner in which support structure 36 is attached to the walls of reaction chamber 20 and member 31 is attached to support structure 36 is not critical to the invention, and may be carried out by many different means. In this way, chemical compound 70, as shown by flow illustrated in FIG. 3, can receive additional heat by conduction and radiation from additional members 31.

FIG. 5 illustrates another embodiment where member 30 is configured to direct the flow of chemical compound 70 into reaction chamber 20 back towards exit end 44 of conduit 40. In this embodiment, member 30 is shown to have a sidewall 104 formed as the ends of member 30. Sidewall 104 can be anywhere to that it is not planar with the major surface of member 30 and directs the flow of chemical compound 70 into reaction chamber 20 back towards exit end 44 of conduit 40. FIG. 5 only illustrates the configuration where sidewall 104 is substantially perpendicular to the major surface of member 30.

FIG. 6 illustrates another embodiment of member 30. Here, member 30 is configured to optimize the destruction of chemical compound 70 comprised of volatile organic compounds (VOC's). VOC's typically have a lower activation energy than halogenated organic compounds, and thus will require less energy to destroy. In addition, the residence time does not need to be as high as the residence time of halogenated organic compounds. In this instance, it is desirable to have member 30 have a plurality of openings 32 therethrough. A mesh configuration is shown in FIG. 6 as an example, however, many other configurations are possible. A wire mesh configuration can be used and may be desirable from the standpoint of cost and convenience to use because a wire mesh can be lightweight.

In this case, a plurality of members 30 may be used as is shown in FIG. 7 (two members 30 are shown) in highly simplified form. The advantage of using a member 30 having a plurality of openings 32 is that residence time may be decreased, but chemical compound 70 will still receive heat from member 30 by conduction and radiation. In this embodiment, more of the heat received will be in the form of radiation from member 30, rather than conduction from member 30 compared to using a member 30 having a solid surface.

When a plurality of members 30 are used, a variety of positions are possible. The second (or subsequent members) member 30 may be positioned so that all or a portion of chemical compound 70 which did not make physical contact with the first member 30 will physically contact the second member 30 (as shown in FIG. 7). Alternatively, second member 30 may be positioned in direct alignment with first member 30, where the openings of the first member 30 line up with the openings of the second member 30, so that the portion of chemical compound 70 which did not make physical contact with first member 30 will not make physical contact with second member 30.

Figure 8:
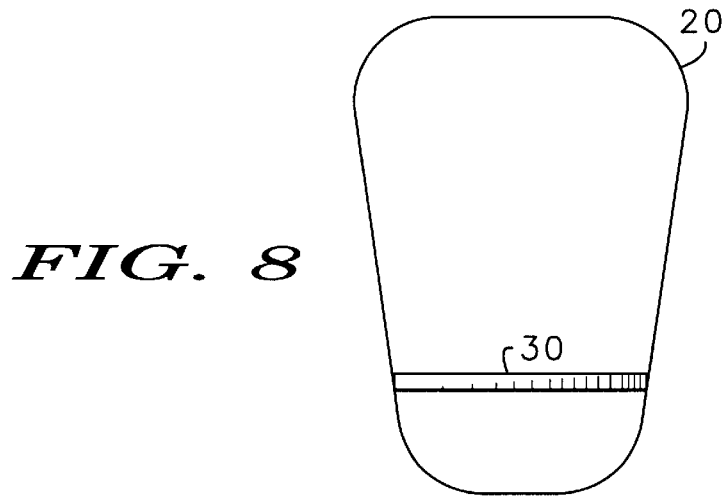
FIG. 8 illustrates another embodiment of a portion of the present invention.
Figure 9:
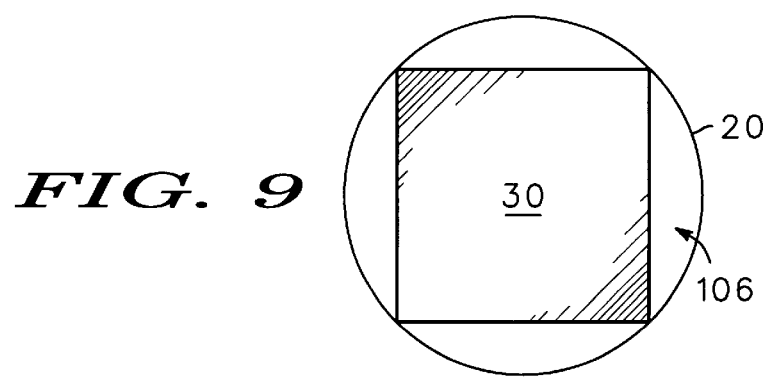
FIG. 9 illustrates another embodiment of a portion of the present invention.

FIGS. 8 and 9 illustrate an embodiment of a way to support member 30 is reaction chamber 20. FIG. 8 illustrates a side view, while FIG. 9 illustrates a top view. In this embodiment, member 30 and reaction chamber 20 are configured so that member 30 is self supported in reaction chamber 20. Member 30 is shown having a square shape, and the wall of reaction chamber 20 is shown having a circular shape. Other shapes which allow self support are possible. Note that the walls of reaction chamber 20 may be tapered so that placement of member 30 in reaction chamber 20 is facilitated. In this embodiment, the surface area of member 30 should leave enough through space 106 in reaction chamber 20 so that end product 77 can exit through outlet 50 without risk of back flow of end product 77 or chemical compound 70 through conduit 40 to processing tool 82. The advantages of this self supporting scheme are its simplicity, reduced cost, and reduced maintenance.

EXAMPLE 1

An example is described to illustrate the specific advantages of the present invention over the prior art, and is not intended to be a limitation of the present invention. A specific example of destruction of chemical compound 70 comprised of a $C_2F_6$ will be described, with reference to FIG. 1.

Reaction chamber 20 is placed in the exhaust vacuum line between the equipment producing $C_2F_6$ and a vacuum source such as vacuum pump 79 shown in FIG. 1. In this particular example, reaction chamber 20 is a vertical reactor having an approximate volume of 10 liters. Reaction chamber 20 runs idle at approximately 25 millitorr and in operation, in this embodiment, at approximately 500–600 millitorr. In this example, the footprint of the apparatus is only approximately 18×23".

Member 30 is comprised of a metal doped substrate which inductively couples to energy 62 of energy source 60 and heats up to a desired temperature. Examples of what member 30 may be comprised of are ceramics with layers of zinc, arsenic and tin or silicon with layers of titanium-nickel-silver formed therein, typically each less than 1 micron thick. Member 30 is approximately horizontally positioned in the middle of reaction chamber 20. The position of member 30 is the vertically in reaction chamber 20 is determined by the desired residence time. The impinged surface of member 30 is approximately two times larger than the cross-sectional area of conduit 40.

Conduit 40 is a circular tube having an inside diameter of approximately 100 millimeter (mm). Exit end 44 of conduit 40 is positioned approximately over the center of member 30 and a distance of 25 mm away from the impinged surface of member 30 so that the flow rate of $C_2F_6$ is constant.

In this example, energy-source 60 is a microwave energy source operating at 2.45 GHz and 750 Watts which emits microwave energy 62 through at least a portion of reaction chamber 20. Member 30 is heated to a temperature of approximately 200–900° C.

The $C_2F_6$ is introduced into reaction chamber 20 at a flow rate of approximately 1.5 liters per minute. A reactive material 90 comprised of oxygen is provided at approximately 1.5 liters per minute. The $C_2F_6$ strikes member 70, member 30 imparts heat to the $C_2F_6$. A hot wall reaction can then take place against member 30; a chemical reaction between the $C_2F_6$ and oxygen takes place to form end products 77 as follows: $C_2F_6+O_2 \rightarrow CO_2+F^-$. $F^-$ represents various forms of fluorine which may be present. In this example, the residence time of the $C_2F_6$ in reaction chamber 20 is approximately 500 milliseconds or less.

Efficiencies of decomposition were demonstrated to be greater than 90% removal of $C_2F_6$. As stated earlier, this level of efficiency has not been able to be achieved by other means in a cost effective way. The use of the present invention therefore allows the decomposition of environmentally undesirable materials which are required to be used in many manufacturing settings.

EXAMPLE 2

Figure 10:
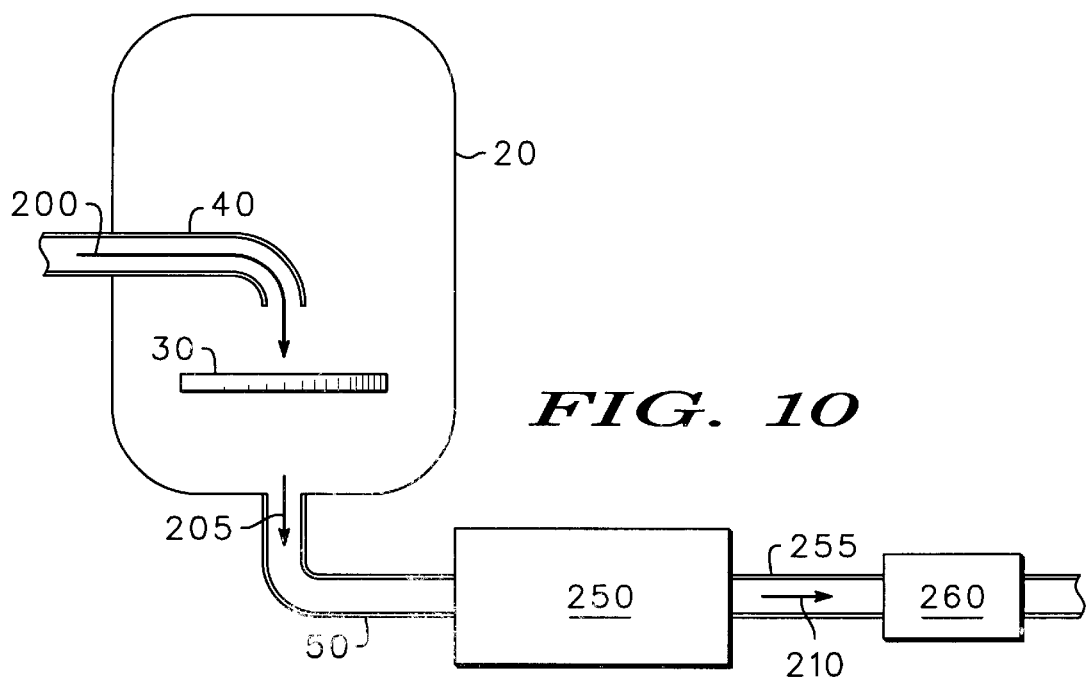
FIG. 10 illustrates an embodiment of an application where the present invention can be utilized.

With reference to FIG. 10, an example of an application where the system of the present invention can be utilized to decompose a chemical compound 200 and react with a reactive material to form an end product 205, and then use decomposed chemical compound 205 to clean a processing tool 250. A simplified schematic of this application is shown in FIG. 10. For example, processing tool 250 can be a Low Pressure Chemical Vapor Deposition (LPCVD) tool used to deposit material such as polysilicon (Si), silicon dioxide ($SiO_2$) or silicon nitride ($SiN_x$) on semiconductor wafers. In this type of equipment, deposition of these materials also takes place on the walls of a reaction tube in which the semiconductor wafers are placed. It is desirable to clean the surface of the reaction tube to avoid particulate contamination of the semiconductor wafers.

Chemical compound 200 is supplied through conduit 40 in reaction chamber 20. In this example, chemical compound 205 is comprised of nitrous fluoride ($NF_3$) or perfluorocompounds (PFC's, such as $C_2F_6$ or $CF_4$) mixed with oxygen ($O_2$). Oxygen is the reactive material which reacts with chemical compound 205 to form end product 205. Member 30 is comprised of a material which can be heated and preferably has a configuration as shown in FIG. 6 if NF3 is used, but a solid member 30 is preferred if PFC's are used. After chemical compound 200 is introduced toward the surface of member 30 to decompose, an example of a reaction which can take place using NF3 is as follows: $NF_3+O_2 \rightarrow NO_2+F^-$. In this embodiment, $NO_2$ and $F^-$ comprise an end product 205. Here, it is desirable to have end product 205 be comprised of $F^-$, which is very reactive when it exits reaction chamber 20. Therefore, no reactive materials that will react with $F^-$ should be provided in reaction chamber 20. End product 205 is exhausted through conduit 50, which is physically coupled to reaction chamber 20. Conduit 50 is physically coupled to a processing tool 250 which has a surface that needs to be cleaned. For the example given here, the following reactions can take place in processing tool 250 to form end products 210 as follows:

$F^-+Si \rightarrow SiF_4$ $F^-+SiN_x \rightarrow SiF_4+N_x$ $F^-+SiO_2 \rightarrow SiF_4+O_2$ The end products 210 of the above reactions are exhausted out of processing tool 250 through a conduit 255 which is physically coupled to a vacuum pump 260 and out to the atmosphere or a collection chamber (not shown).

The advantage of cleaning performed using the present invention is that cleaning may be done in situ, i.e., without removing the portion (the reaction tube) of processing tool that needs to be cleaned.

What is claimed is:

1. A method of decomposing a chemical compound comprising the steps of:

providing an energy source which generates energy;

providing a reaction chamber;

providing a member positioned in the reaction chamber;

heating the member with the energy of the energy source; and introducing a flow of a chemical compound into a confined portion of the reaction chamber to impinge the member so that the chemical compound receives heat from the member and the chemical compound decomposes to form an end product and wherein no substantial deposition of the end product takes place on the member during decomposition of the chemical compound.

2. The method of claim 1 wherein the step of providing the member comprises providing the member comprised of a first material which is heated by the energy source and a second material which chemically reacts with the chemical compound.

3. The method of claim 1 wherein the step of providing the energy source comprises providing an energy source comprised of a microwave energy source using a 0.9–11 GHz frequency range, wherein the member is inductively coupled with the microwave energy source.

4. The method of claim 1 wherein the step of providing the energy source comprises providing an energy source comprised of a microwave energy source using a 2.45 GHz frequency, wherein the member is inductively coupled with the microwave energy source.

5. The method of claim 1 further comprising the step of forming a plasma in the reaction chamber.

6. The method of claim 1 further comprising the step of forming a vacuum in the reaction chamber.

7. The method of claim 1 wherein the step of providing the member comprises providing a member having a major surface and the step of introducing the flow of the chemical compound comprises introducing the flow of the chemical compound substantially perpendicular to the major surface of the member.

8. The method of claim 1 wherein the step of providing the member comprises providing a member having a major surface and the step of introducing the flow of the chemical compound comprises introducing the flow of the chemical compound, wherein the major surface of the member is not substantially parallel to the flow of the chemical compound.

9. The method of claim 1 wherein the step of introducing the flow of the chemical compound comprises restricting the flow of the chemical compound into a portion of the reaction chamber through a conduit having an exit end which extends into the reaction chamber.

10. The method of claim 9 wherein the exit end of the conduit is positioned adjacent the member such that at least a portion of the flow of the chemical compound is directed back into a portion of the conduit.

11. The method of claim 9 wherein the exit end of the conduit is positioned a minimum distance away from the member such that the flow rate of the chemical compound exiting out of the exit end of the conduit is not altered.

12. The method of claim 9 wherein the exit end of the conduit is positioned a maximum distance away from the member equal to 2 times the distance away from the member where the flow rate of the chemical compound exiting out of the exit end of the conduit is not altered.

13. The method of claim 1 further comprising providing a reactive material in the reaction chamber which reacts with the chemical compound to form an end product.

14. The method of claim 1 wherein heat is transferred from the member to the chemical compound by conduction and radiation.

15. The method of claim 1 wherein the step of heating the member is comprised of heating the member directly by the energy of the energy source to a temperature equal to or greater than 200° C.

16. A method of decomposing a chemical compound comprising the steps of:

providing an energy source which generates energy;

providing a reaction chamber;

providing a member positioned in the reaction chamber;

heating the member with the energy of the energy source;

providing a flow of a chemical compound into the reaction chamber; and restricting the flow of the chemical compound into a portion of the reaction chamber so that the flow is introduced towards the member and the chemical compound decomposes to form an end product and wherein no substantial deposition of the end product takes place on the member during decomposition of the chemical compound.

17. A method of decomposing a compound comprising the steps of:

providing an energy source which generates energy;

providing a reaction chamber;

providing a member positioned in the reaction chamber;

heating the member with the energy of the energy source; and providing a flow of a chemical compound into the reaction chamber through a conduit, the conduit extending into a portion of the reaction chamber, wherein the flow of the chemical compound is generated as a result of processing a semiconductor wafer; and wherein the flow of the chemical compound exits from an exit end of the conduit such that the flow is introduced towards the member and wherein the exit end of the conduit is positioned at most a distance away from the member equal to 2 times the distance away from the member where a flow rate of the chemical compound exiting out of the exit end of the conduit does not backflow.

* * * * *